Patented Sept. 17, 1929

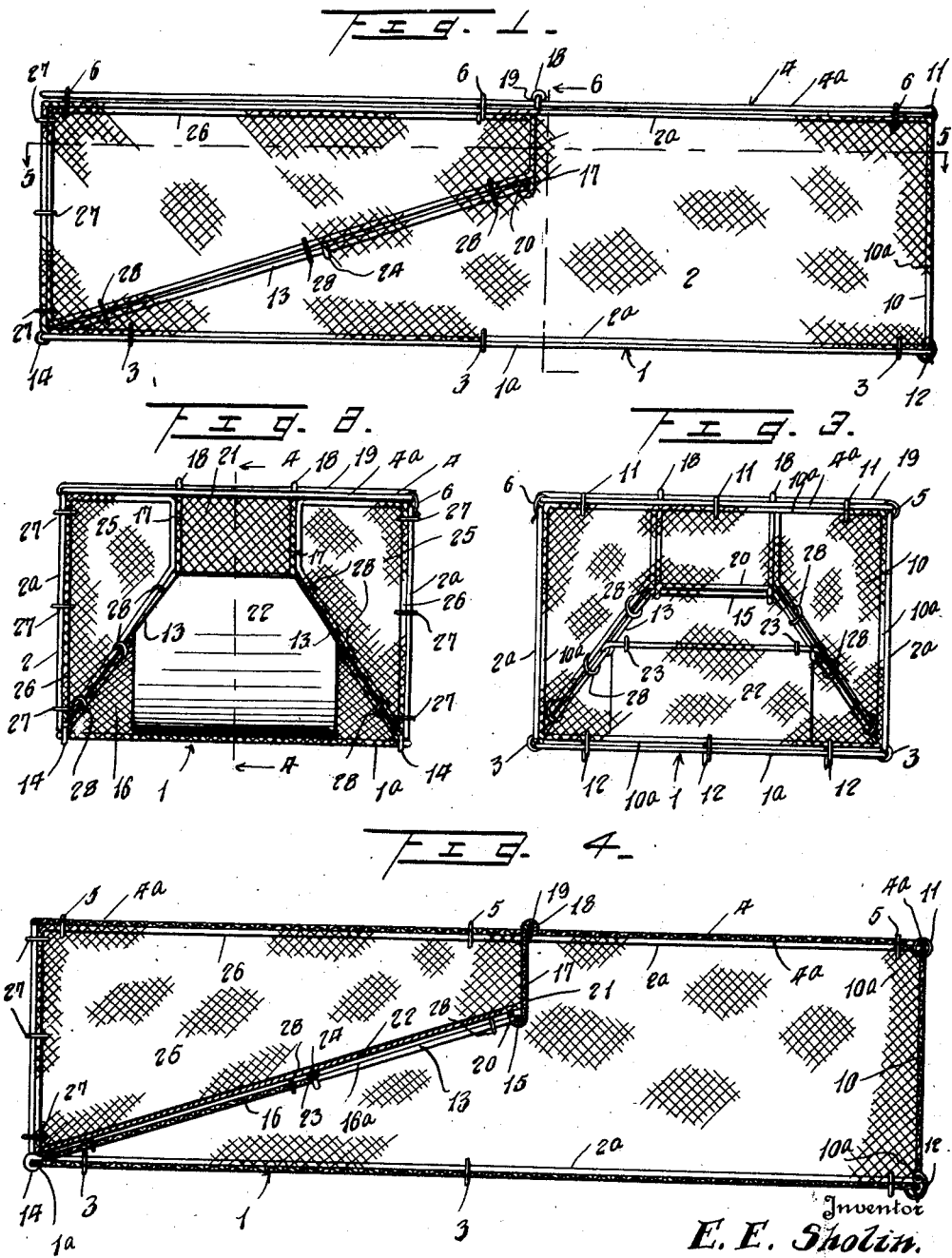

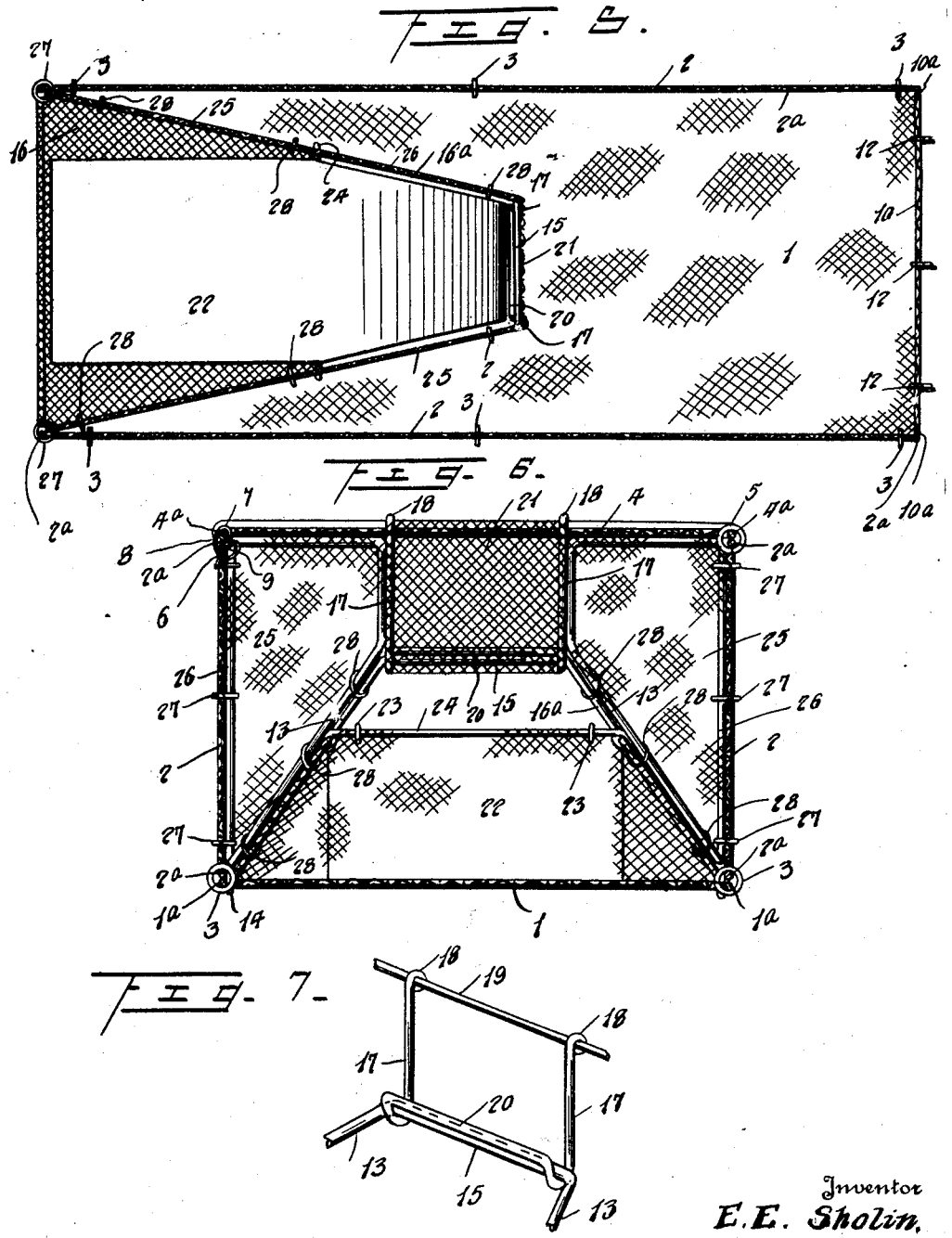

1,728,701

UNITED STATES PATENT OFFICE

EDWIN E. SHOLIN, OF ELKO, NEVADA

ANIMAL TRAP

Application filed March 29, 1928. Serial No. 265,696.

The invention relates to animal traps and has particular reference to traps used for catching smaller game animals such for instance as muskrats.

The invention has for its principal object the provision of a trap that is reasonable in cost of manufacture, effective in operation, and that is constructed of hingedly engaged sections to enable collapsing the trap into a small compass for transportation and storage.

The invention will be described in detail hereinafter and will be found illustrated in the accompanying drawings, in which Figure 1 is a side view in elevation of the improved trap, Figure 2 is a front view in elevation, Figure 3 is a rear view in elevation, Figure 4 is a longitudinal sectional view on a plane indicated by the line 4—4 of Figure 2, Figure 5 is a horizontal sectional view on a plane indicated by the line 5—5 of Figure 1, Figure 6 is transverse sectional view on a plane indicated by the line 6—6 of Figure 1, and Figure 7 is a detail of the hook frame for supporting the entrance way to the trap.

In the drawings similar reference characters are used to designate corresponding parts throughout the several views.

The improved animal trap is adapted to be folded when not in use for transportation and storage and is furthermore adapted to be quickly set up for use and comprises sections made up of frames constructed preferably of metal rods or heavy wire and covered with a woven wire fabric, this construction insuring cheapness of cost in making the trap.

In the drawings the bottom section is designated 1, the side sections are designated 2, and the frames of the bottom section 1 and the side sections 2, designated 1ª and 2ª, respectively, are hingedly secured together by means of metal rings 3 to permit folding movement of the sections relatively to one another. The top wall of the trap designated 4 has its frame 4ª pivotally engaged with one of the side walls 2 by means of metal rings 5, while the other edge of the frame 4ª is releasably securable to the upper side of the frame 2ª in the opposite side section 2 by means of a pivoted latch member 6 that is preferably formed of a suitable gage of wire having one end formed with an open eye 7 to receive the frame 4ª and provided with an outwardly curved portion 8 in the form substantially of a half circle and the free end of the wire bent upwardly of the part 8 and causing it to form a tongue 9 to resiliently engage the upper side of the frame 2ª heretofore referred to to hold the bottom, sides, and top in assembled position.

The rear wall is designated 10 and has the upper side of its frame 10ª hingedly secured to the frame 4ª by means of rings 11, while the lower side of the frame 10ª has a latch 12 similar in construction to the latch 6 heretofore described to engage the frame 1ª to hold the rear wall 10 in a closed position relatively to the other wall to form a cage for the animals to be entrapped by the instrumentalities to be hereinafter described, and the rear wall 10 provides a door through which the entrapped animals may be removed.

The end of the trap opposite to the end on which the wall 10 is pivoted, forming the front end, is open to provide an entrance for the animal, and pivotally engaging the front of the frame 1ª at said end of the trap, the frame having side members 13 provided with loops 14 pivotally engaging said end of the frame 1ª, said side members being inclined toward one another inwardly of the trap and connected by a cross member 15. Said runway frame is covered for a part of the distance inwardly of the trap by means of a wire fabric 16, the remainder of the frame being uncovered to form an opening into the trap when the frame is in set position. As shown, the runway frame is held in an upwardly inclined position by means of a frame 17 made of double bars of heavy wire and provided with eye loops 18 that pivotally engage bar 19 secured transversely of the frame 4ª, the free end of said frame being bent back on itself to
form a hook member 20 that engages the
cross piece 15 to hold the runway frame in
its upwardly inclined position. The frame
17 is covered with wire screen fabric 21
that forms a barrier at the upper end of
the runway. 22 indicates a plate having
loops 23 that pivotally engage the cross rod
24 supported on the side members 13, said
plate having one of its ends covering the
opening 16ª in the runway frame while its
other end is normally in engagement with
the screen fabric 16, and said plate 22 is
adapted to be tilted by the weight of the
animal and over the opening 16ª to precipi-
tate the animal into the cage of the trap. A
lure or bait of suitable character may be
arranged in the trap, preferably on the
screen fabric 21 of the frame 17.

At each side of the runway frame is pro-
vided a partition 25 consisting of a frame
26 that pivotally engages the frame 2ª by
means of rings 27 and is shaped to close the
side of the runway and secured to the side
members 13 thereof by means of open rings
or other suitable detachable fastenings 28 to
permit detachment of the frame 26 from the
runway frame when it is desired to collapse
the trap for transportation or storage.

When the trap is in the position shown
in the drawings and the animal that is at-
tracted by the bait or other lure ascends the
plate 22 supported by the runway frame;
reaches the upper end of the plate, his
weight will overcome the weight of the
longer end of the plate supported by the
screen fabric 16 and will be precipitated into
the trap. When the weight of the animal
is released from the upper end of the plate
the heavier end will return the plate to its
normal position and the trap will be ready
to catch another animal.

The detachable and hinged features of
the trap clearly make it possible to fold the
trap into a small compass for transportation
and storage, the partitions 25 being discon-
nected from the runway frame members 13
permit these partition members to fold back
against the sides 2, while releasing the run-
way frame number 15 from the hook 20 will
permit the runway frame to fold down-
wardly onto the bottom 1. Then by releas-
ing the latches 8 from engagement with the
frame 2ª and the latches 12 from engage-
ment with the frame 1ª the top and sides
and ends may be folded into a compact
position.

What is claimed is:—

An animal trap, comprising a collapsible
cage consisting of foldable sections includ-
ing a bottom, side walls hingedly engaging
the bottom, a top wall hingedly engaging
one of said side walls and provided with
latch means engaging the other side wall,
a rear wall hingedly engaging the top wall
and provided with latch means engaging
one end of the bottom, a runway forming
the entrance to the trap and pivotally en-
gaging at one of its ends the other end of
the bottom, a hooked panel frame supported
on the top wall and engaging the other end
of said runway, said runway having an
opening in the end engaged by the hooked
frame, a tilting plate pivotally secured in-
termediate of its ends to said runway and
adapted to close said opening, said runway
being tapered inwardly of the cage, and
partitions pivotally engaging the side walls
and secured to the side edges of said run-
way.

In testimony whereof I affix my signature.
EDWIN E. SHOLIN.